United States Patent [19]

Schmaling

[11] Patent Number: 4,474,452

[45] Date of Patent: Oct. 2, 1984

[54] SAFETY DEVICE FOR CAM YOKE USED IN ELECTROPHOTOCOPIER RECIPROCATING CARRIAGE

[75] Inventor: Roderick N. Schmaling, Brookfield Center, Conn.

[73] Assignee: Pitney Bowes Inc., Stamford, Conn.

[21] Appl. No.: 263,385

[22] Filed: May 13, 1981

[51] Int. Cl.³ .................... G03G 15/28; G03G 15/32
[52] U.S. Cl. ........................................................ 355/8
[58] Field of Search ................ 355/3 R, 8, 75; 74/27, 74/37, 55

[56] References Cited

U.S. PATENT DOCUMENTS

| | | | |
|---|---|---|---|
| 3,635,554 | 1/1972 | Hodges | 355/8 |
| 4,297,023 | 10/1981 | Nagoshi | 355/8 |
| 4,315,683 | 2/1982 | Schmaling et al. | 355/8 |

Primary Examiner—Fred L. Braun
Attorney, Agent, or Firm—Lawrence E. Sklar; Soltom, Jr., William D.; Albert W. Scribner

[57] ABSTRACT

In an electrophotocopying machine having a reciprocating carriage driven by a constant speed chain having a drive pin coupled thereto. The machine includes a camming yoke fixedly connected to the reciprocating carriage and disposed in a plane parallel to the plane of the constant speed chain. The yoke includes a plurality of channels therein to receive the drive pin. The channels include an upper, horizontal channel open at both ends thereof, a lower, horizontal channel open at both ends thereof, and a pair of substantially vertical channels spaced from each other and connecting the upper and lower horizontal channels to each other. The yoke further includes an upper pawl pivotably secured to the top of the camming yoke and biased downwardly and having a slot therein for receiving the drive pin, and a lower pawl pivotably secured to the bottom of the camming yoke and biased downwardly and having a camming surface therein for receiving the drive pin, whereby the drive pin is released from driving engagement with the pawls if the carriage encounters a predetermined force.

5 Claims, 6 Drawing Figures

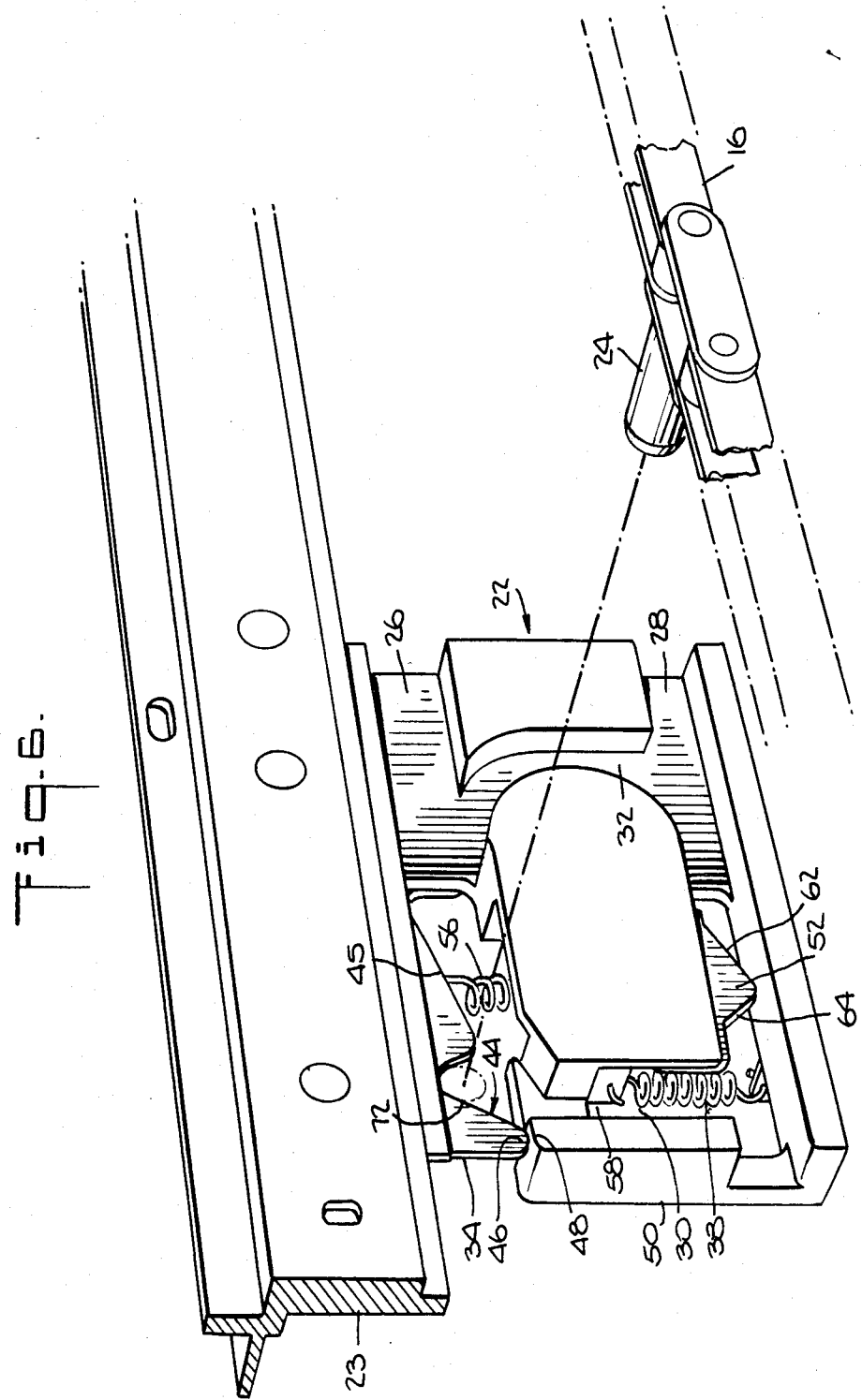

SAFETY DEVICE FOR CAM YOKE USED IN ELECTROPHOTOCOPIER RECIPROCATING CARRIAGE

BACKGROUND OF THE INVENTION

The instant invention relates to electrophotocopiers having chain driven, reciprocating carriages for supporting an original document to be scan exposed, and more particularly to a camming yoke for coupling the reciprocating carriage to its drive chain.

In many electrophotocopiers marketed today, a reciprocating carriage is employed in order to scan expose an original document supported thereon. The reciprocating carriage is typically driven by a constant speed chain rotably supported by two sprockets disposed one near each end of the path of the reciprocating carriage. A T-shaped yoke is coupled to the carriage and a drive pin is coupled to the drive chain and vertically movable inside a vertical slot in the yoke. See, for example, U.S. Pat. No. 3,512,866, issued May 19, 1970. In this situation, the stroke of the reciprocating carriage is identical in length to the distance between the two sprockets supporting the drive chain. It is generally desirable to minimize the stroke of the carriage in order to minimize the space requirements for the copier, to increase the stability of the carriage, and to minimize the likelihood of the carriage becoming jammed. However, the length of the drive chain and the distance between the sprockets supporting the drive chain are generally determined by other parameters of machine design, such as synchronization with the photoreceptor belt, and thus cannot be reduced as a means of reducing the stroke of the carriage.

In reciprocating carriage type photocopiers, frequently when a maximum length copy is being made, the platen, in the course of its stroke, will completely pass over the transparent, exposure window, thereby allowing illumination from the photocopier to directly impinge on the operator. A shutter is employed in the copier to obviate this problem. In such case, it is desirable to shorten the stroke of the reciprocating carriage to be able to eliminate the need for a shutter.

The foregoing problems are overcome by the instant invention which provides a unique camming yoke and safety device for coupling the reciprocating carriage to the drive chain so that the stroke of the reciprocating carriage becomes less than the distance between the sprockets supporting the drive chain.

SUMMARY OF THE INVENTION

The instant invention provides an improvement in an electrophotocopying machine having a reciprocating carriage driven by a constant speed chain having a drive pin coupled thereto. The improvement comprises a camming yoke fixedly connected to the reciprocating carriage and disposed in a plane parallel to the plane of the constant speed chain. The yoke includes a plurality of channels therein to receive the drive pin. The channels include an upper, horizontal channel open at both ends thereof, a lower, a horizontal channel open at both ends thereof, and a pair of substantially vertical channels spaced from each other and connecting the upper and lower horizontal channels to each other. The yoke further includes an upper pawl pivotably secured to the top of the camming yoke and biased downwardly and having a slot therein for receiving the drive pin, and a lower pawl pivotably secured to the bottom of the camming yoke and biased downwardly and having a camming surface therein for receiving the drive pin, whereby the drive pin is released from driving engagement with said pawls if the carriage encounters a predetermined force.

BRIEF DESCRIPTION OF THE DRAWINGS

FIG. 6 is an enlarged rear perspective view of the camming yoke seen in FIG. 1.

DETAILED DESCRIPTION

Figure 1:
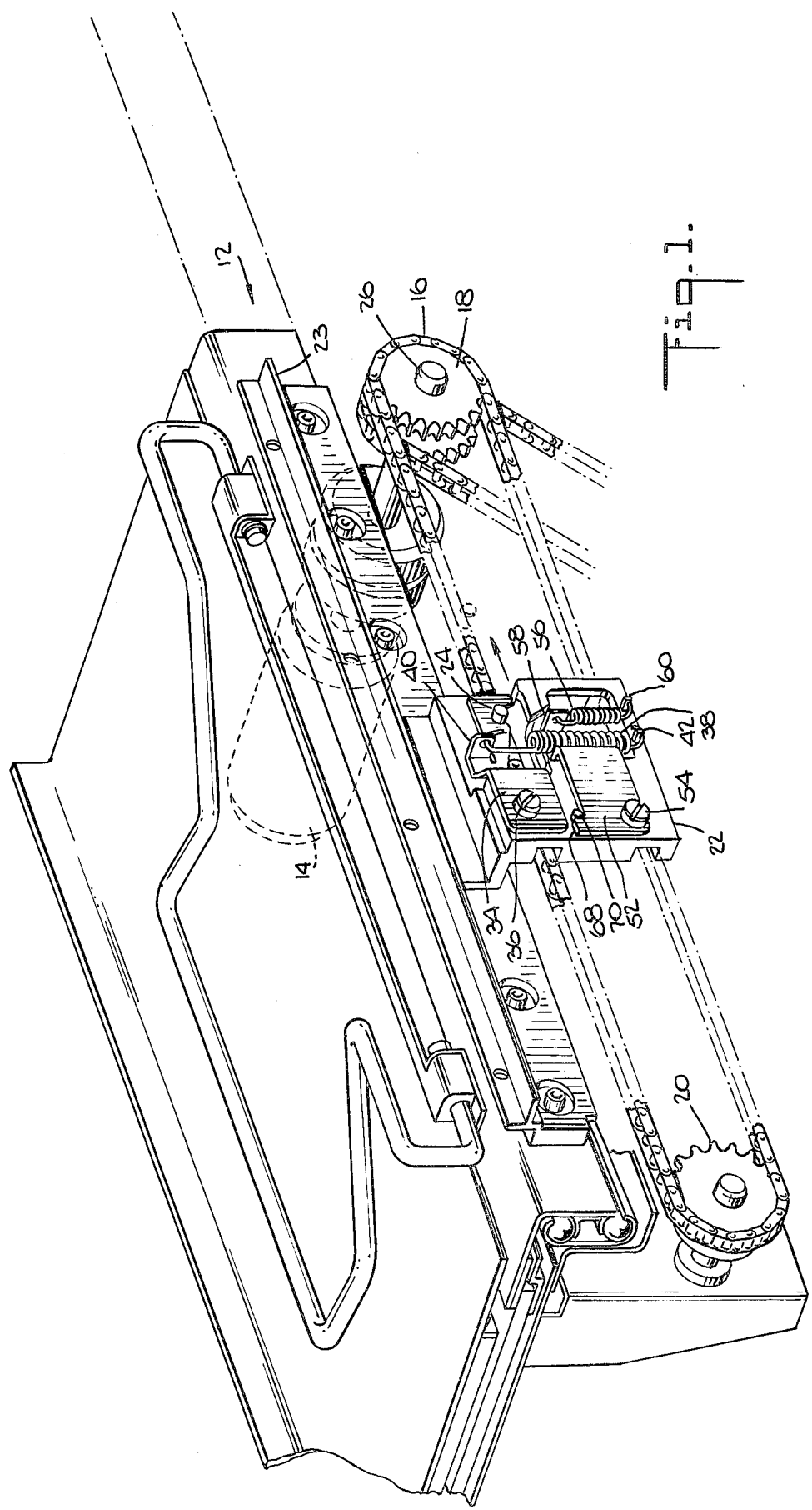
FIG. 1 is a schematic perspective view of an electrophotocopying machine having a reciprocating carriage and employing a camming yoke in accordance with the instant invention.

In describing the preferred embodiment of the instant invention, reference is made to the drawings wherein there is seen in FIG. 1 a reciprocating carriage 12 which is movably mounted on top of a cabinet housing of an electrophotocopier (not shown). During a copy cycle, the carriage 12 moves to the right a predetermined distance that is long enough to enable the copier to make copies of fourteen inch long documents.

The carriage 12 and other driven components (not shown) are driven by the main motor 14. A carriage drive chain 16 travels around two sprockets 18 and 20 that are disposed one near each end of the path of the carriage 12. A camming yoke 22, discussed in further detail hereinafter, is coupled to the carriage 12 through rail 23 and a drive pin 24 is coupled to the camming yoke 22. The carriage sprocket 18 is coaxially mounted on the drive shaft 26 of the main motor 14. As the motor 14 turns, the chain 16 is driven around the sprockets 18 amd 20. The drive pin 24 pulls the yoke 22 (on the carriage 12) along with the chain 16. As the pin 24 travels around either sprocket 18 and 20 the carriage 12 is first slowed and then reversed in its direction of travel to achieve reciprocal motion.

The camming yoke 22 is characterized by a plurality of channels therein to receive the drive pin 24. The channels include an upper horizontal channel 26 (see FIG. 6) having both ends open thereof, and a lower horizontal channel 28 also having both ends open thereof. Connecting the upper channel 26 and the lower channel 28 at the ends thereof are a pair of substantially vertical forward and rearward channels 30 and 32 respectively. The rearward vertical channel 32 is also arcuate to facilitate the drive pin 24 as it traverses the carriage sprocket 18. As best seen in FIG. 6, the forward vertical channel 30 and the forward halves of the horizontal channels 26 and 28 are defined by two sides since these channel portions extend completely through the thickness of the camming yoke 22. The rearward vertical channel 32 and the rearward halves of the horizontal channels 26 and 28 are defined by three sides since these channel portions do not extend completely through the thickness of the camming yoke 22.

An upper pawl 34 is pivotably secured by means of a bolt 36 to the top portion of the camming yoke 22. A coil spring 38 attaches at its top end to an angled flange 40 of the upper pawl 34 and at its bottom end to a slotted extension 42 extending from the bottom portion of the camming yoke. At the end on the underside of the upper pawl 34 remote from the bolt 36 is a slot 44 for receiving the drive pin 24. Adjacent the slot 44 is an inclined camming surface 45 for engagement with the drive pin 24. The coil spring 38 biases the end 46 of the upper pawl 34 downwardly against the horizontal top surface 48 of the forwardmost section 50 of the camming yoke 22.

A lower pawl 52 is pivotably secured by means of a second bolt 54 to the bottom portion of the camming yoke 22. A second coil spring 56 attaches at its top end to a second angled flange 58 of the lower pawl 52 and at its bottom end to a second slotted extension 60 extending from the bottom portion of the camming yoke 22. At the end on the underside of the lower pawl 52 remote from the second bolt 54 are a pair of camming surfaces 62 and 64 meeting to form a V. The camming surface 64 is angled more vertically than horizontally as opposed to the camming surface 62 which is angled more horizontally than vertically. The camming surface 64 is so vertically angled in order that it may be drivingly engaged by the drive pin 24. The second coil spring 56 biases the forward vertical surface 66 of a vertically extending arm 68 of the lower pawl 52 against a pin 70 extending outwardly from the camming yoke 22, which results in the lower pawl 52 being biased downwardly.

Figure 2:
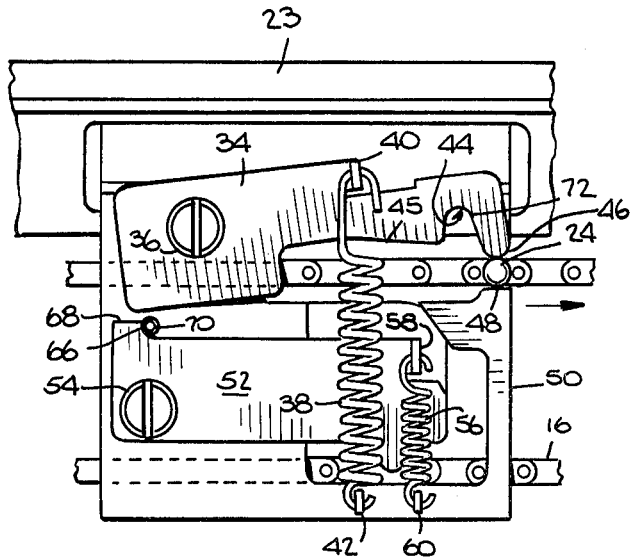
FIG. 2 is a front elevational view of the camming yoke seen in FIG. 1 showing the upper pawl being released from driving engagement with the drive pin.
Figure 3:
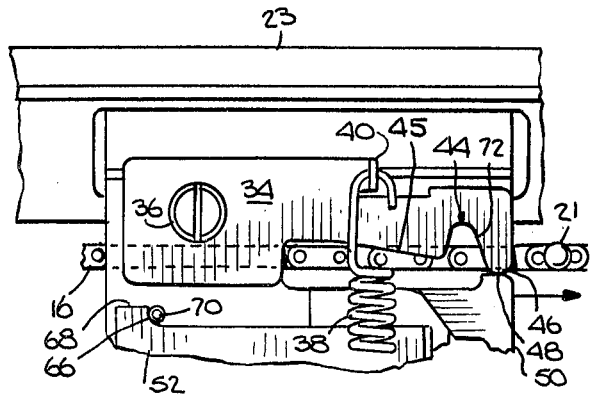
FIG. 3 is similar to FIG. 2 except that the drive pin is now completely released from the upper pawl of the camming yoke.

In the home position of the carriage 12, the drive pin 24 is located at the 9 o'clock position on the sprocket 20. During the scan portion of the carriage cycle, in which the carriage 12 is moved to the right, the pin 24 is rotated in the clockwise direction upwardly so that it moves along the inclined camming surface 45 of the upper pawl 34, thereby rotating the slot 44 upwardly until the pin 24 reaches the slot 44 at which time the upper pawl 34 rotates downwardly and the carriage 12 begins the scan portion of its cycle. The pin 24 is thus surroundingly engaged by the slot 44, as seen in FIG. 1, until the pin 24 reaches the sprocket 18, or until such time as the carriage 12 encounters a predetermined force such as a person blocking its path. If the latter situation should develop, overdriving of the carriage 12 is prevented by the forward motion of the pin 24 overcoming the downward bias of the upper pawl 34 whereby the upper pawl 34 is rotated counter-clockwise. The rotation of the upper pawl 34 is achieved owing to the forward, inclined camming surface 72 of the slot 44, and FIG. 2 shows the position of the pawl 34 once the pawl 34 has been rotated out of driving engagement with the pin 24. FIG. 3 illustrates the position of the pawl 34 once the pin 24 has cleared the slot 44. The pin 24 would then simply continue to be driven by the drive chain 16 around the sprocket 18 and re-enter the camming yoke 22 through the open end of the lower horizontal channel 28 to thereby engage the camming surface 64 of the lower pawl 52 and return the carriage 12 to its line position.

Figure 4:
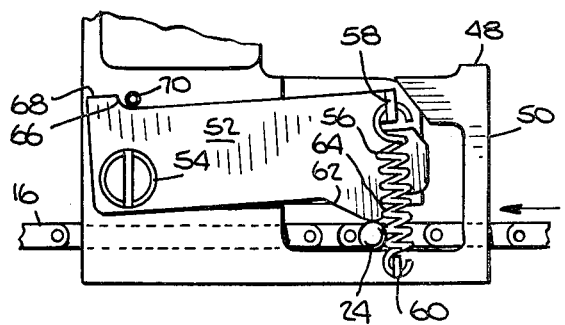
FIG. 4 is a front elevational view of the camming yoke showing the drive pin being released from driving engagement with the lower pawl of the camming yoke.
Figure 5:
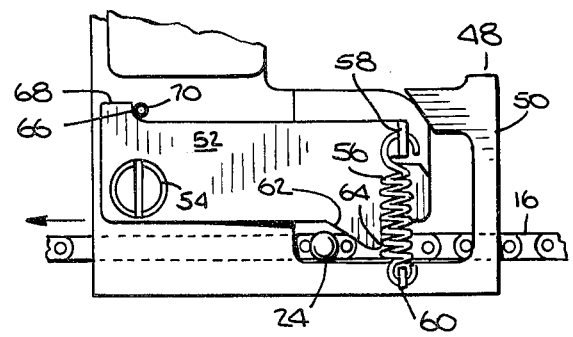
FIG. 5 is similar to FIG. 4 except that the drive pin is now completely released from the lower pawl of the camming yoke.

In the normal situation, where the carriage does not encounter a predetermined force, the pin 24 is driven around the sprocket 18, and in so doing, the yoke 22 is slowed down until the pin 24 reaches the 3 o'clock position on the sprocket 18. The pin 24 then traverses the rearward vertical channel 32 during which time the carriage 12 is caused to begin returning to its home position by traveling to the left. The drive chain 16 eventually brings the pin 24 around to engage the camming surface 64 of the lower pawl 52, thereby urging the lower pawl 52 and hence the carriage 12 to return to the home position by translating the lower pawl 52 and the carriage 12 to the left. Once the carriage 12 reaches the home position, the continued leftward movement of the drive pin 24 overcomes the downward bias of the pawl 52 (as seen in FIG. 4) and is released from driving engagement with the pawl 52 (as seen in FIG. 5) until it returns to the 9 o'clock position on the sprocket 20.

If the carriage 12 encounters a predetermined force, such as a person blocking its return to the home position, overdriving of the carriage 12 in the return portion of the carriage cycle is prevented by the leftward motion of the pin 24 overcoming the downward bias of the lower pawl 52 whereby the lower pawl 52 is rotated counter-clockwise. The rotation of the lower pawl 52 is achieved owing to the camming surface 62. The pin 24 would then simply continue to be driven by the drive chain 16 until it was returned to the 9 o'clock position on the sprocket 20. On the next cycle, the pin 24 would enter the camming yoke 22 through the open end of the upper horizontal channel 26 to thereby engage the upper pawl 34 and return the carriage 12 to the home position prepatory to a full copying cycle.

The tensions of the coil springs 38 and 56 may be varied depending upon the angles of the camming surfaces 44 and 72.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What is claimed is:

1. In an electrophotocopying machine having a reciprocating carriage driven by a constant speed chain having a drive pin coupled thereto, the improvement comprising a camming yoke fixedly connected to said reciprocating carriage and disposed in a plane parallel to the plane of the constant speed chain, said camming yoke having a plurality of channels therein to receive said drive pin, said channels including an upper, horizontal channel open at both ends thereof, a lower, horizontal channel open at both ends thereof, and forward and rearward, substantially vertical channels spaced from each other and connecting the upper and lower horizontal channels to each other, an upper pawl pivotably secured to the top of the camming yoke and biased downwardly and having a slot therein for receiving said drive pin, and a lower pawl pivotably secured to the bottom of the camming yoke and biased downwardly and having a camming surface therein for receiving said drive pin, whereby the drive pin is released from driving engagement with said pawls if the carriage encounters a predetermined force.

2. The improvement of claim 1, wherein the rearward vertical channel is also arcuate to facilitate acceptance of the drive pin.

3. The improvement of claim 2, wherein the forward vertical channel and the forward halves of the horizontal channels are defined by two sides only.

4. The improvement of claim 3, wherein the rearward vertical channel and the rearward halves of the horizontal channels are defined by three sides.

5. The improvement of claim 4, wherein the upper and lower pawls are biased downwardly by means of coil springs.

* * * * *